United States Patent [19]

Schumacher

[11] Patent Number: 4,848,188

[45] Date of Patent: Jul. 18, 1989

[54] MOMENTUM COMPENSATED ACTUATOR WITH REDUNDANT DRIVE MOTORS

[76] Inventor: Larry L. Schumacher, 18876 Tenderfoot Trail, Newhall, Calif. 91321

[21] Appl. No.: 183,906

[22] Filed: Apr. 20, 1988

Related U.S. Application Data

[63] Continuation-in-part of Ser. No. 31,900, Mar. 30, 1987, abandoned.

[51] Int. Cl.$^4$ .................... F16H 1/28; F16H 57/10; F16H 3/44
[52] U.S. Cl. ....................................... 74/802; 74/793; 74/781 R
[58] Field of Search ............. 74/793, 802, 801, 781 R, 74/782, 783, 394

[56] References Cited

U.S. PATENT DOCUMENTS

| | | | |
|---|---|---|---|
| 1,299,629 | 4/1919 | Snider | 74/793 |
| 3,023,636 | 3/1962 | Kelley et al. | 74/781 R |
| 3,067,631 | 12/1962 | Kayasaka et al. | 74/781 R |
| 3,163,056 | 12/1964 | Clarke | 74/793 |
| 3,792,629 | 2/1974 | Applebury | 74/801 |
| 3,979,971 | 9/1976 | Generke et al. | 74/802 X |
| 4,287,792 | 9/1981 | Dailey | 74/802 X |
| 4,505,163 | 3/1985 | Falkner | 74/793 X |

FOREIGN PATENT DOCUMENTS

| | | | |
|---|---|---|---|
| 1098341 | 3/1981 | Canada | 74/802 |
| 3225950 | 1/1984 | Fed. Rep. of Germany | 74/802 |
| 888416 | 12/1943 | France | 74/793 |
| 672411 | 7/1979 | U.S.S.R. | 74/781 R |
| 616838 | 11/1979 | U.S.S.R. | 74/793 |
| 742654 | 6/1980 | U.S.S.R. | 74/789 |

Primary Examiner—Dirk Wright

[57] ABSTRACT

This invention is a rotary actuator in which the angular momentum of a ratationally pointed structure is offset by the angular momentum of a compensating inertia. The compensating inertia structure is rotational driven relative to the pointed structure across a differential gear which assures the ratio of the rotational rate of the compensating inertia to the rotational rate of the pointed structure is a negative constant. The differential gear consist of a stationary gear fixed to the base vehicle, a platform gear axially coincident with the stationary gear but free to rotate relative to the stationary gear being fixed to the pointed structure. Planetary gears mesh with the stationary and planetary gears and are driven relative to the compensating inertia structure by planetary drive motors. The planetary drive motors are part of the rotating compensating insertia structure and are symmetrically positioned around the stationary gear axis driving the planetary gears around the periphery of the stationary gear and around the periphery of the platform gear. Because the diameter of the stationary gear is larger than the diameter of the platform gear assures the ratio of the rotational rate of the compensating inertia structure of the rotational rate of the pointed structure relative to the stationary gear axis is a negative constant. The magnitude of the rotational rate difference between the compensating inertia and pointed structure can be designed as large as desired by making the platform gear diameter approach the stationary gear diameter. Mechanical backlash is eliminated at rotational rate polarity changes by assigning one planetary drive motor polarity to one motor and the opposite polarity to a different planetary drive motor. Motor redundancy is achieved by having at least one planetary drive motor available in the event of a motor failure. Since the redundant planetary drive motors are part of the compensating inertia, they reduce the mass of inactive inertia structure required to achieve the desired compensating inertia magnitude.

14 Claims, 2 Drawing Sheets

MOMENTUM COMPENSATED ACTUATOR WITH REDUNDANT DRIVE MOTORS

This application is a Continuation-in-Part of pending prior Application Ser. No. 07/031,900, filed on Mar. 30, 1987, of Larry L. Schumacher for A Momentum Compensated Actuator with Redundant Drive Motors and now abandoned.

FIELD OF THE INVENTION

The invention is a motor driven gear mechanism for rotationally articulating a pointed device relative to a compensating inertia.

BACKGROUND OF THE INVENTION

Flexible body motions in large flexible space vehicles cause pointing disturbances for pointed instruments attached to the space vehicle. Large instrument pointing systems which torque relative to the flexible vehicle can cause structural instabilities and disturb other pointed devices. Momentum compensation methods have been used to torque pointed devices relative to rigid compensating inertias to minimize space vehicle disturbances, but these momentum compensating devices have been excessively massive or introduce pointing disturbances due to mechanism nonlinearities or mechanism rotational mass centers off the actuator rotational axis. Mass of compensating inertias can be minimized by rotating them more rapidly with the opposite polarity than the devices they compensate. The ratio of the compensating inertia angular rate to the pointed device angular rate must be kept a negative constant to assure accurate momentum compensation and device pointing. Momentum compensation methods include motor driven pointed devices with motor driven compensating inertias, or one motor driving both compensating inertia and pointed device with mechanical means such as gear mechanisms between the pointed device and compensating inertia.

Momentum compensation methods that require measurement of the pointed device and compensating inertia rotational rates do not have adequate sensors or controllers to provide the fixed rotational rate ratio required for precision pointing. To assure momentum compensation at all times, a mechanical backlash free rotational link between the pointed device and compensating inertia is desired. For these reasons a high gear ratio, single step gear mechanism with no backlash is the preferred rotational link between the pointed device and compensating inertia. The momentum compensated geared actuators to date do not have drive motor redundancy provisions because of the actuator mass penalties and backlash considerations. Accordingly, the objects of this invention are to provide a mechanical momentum compensated rotary actuator with the following features:

large single step rotational speed and polarity difference between the pointed device and compensating inertia;
provisions to eliminate mechanical backlash effects between pointed device and compensating inertia;
provisions to position the combined mass centers of all rotating elements on the actuator rotational axis;
provisions for providing ball bearing preloads to maintain rotating element mass centers on their rotational axis;
provisions to accommodate redundant actuator drive motors;
provisions to minimize actuator mass penalty from addition of redundant active actuator elements.

SUMMARY OF THE INVENTION

The momentum compensated rotational actuator in this invention uses a differential gear mechanism to provide a large single step rotational speed and polarity difference between the pointed device and compensating inertia. The differential gear mechanism has gears axially aligned on two parallel axes. One axis, the actuator rotational axis, is fixed relative to the base vehicle structure being axially coincident with the stationary gear which is fixedly attached to the base vehicle structure. The actuator rotational axis is also axially coincident with a platform gear which is rotationally supported relative to the stationary gear and rotationally supported relative to the base vehicle and is fixedly attached to the pointed device. The other axis, the motor axis, is maintained parallel to the stationary axis by the compensating inertia structure which is rotationally supported relative to the actuator rotational axis of the stationary and platform gears. A planetary motor shaft coincident with the motor axis has two planetary gears fixedly attached one meshing with the stationary gear and one meshing with the platform gear. A motor torques the planetary motor shaft relative to the compensating inertia structure causing the planetary gear meshing with the stationary gear to roll around the periphery of the stationary gear resulting in rotation of the compensating inertia structure around the stationary axis, and causing the planetary gear meshing with the platform gear to roll around the periphery of the platform gear resulting in rotation of the platform gear around the actuator rotational axis.

The ratio of the compensating inertia rotational rate to the platform gear rotational rate relative to the actuator axis is negative if the diameter of the platform gear planetary gear is greater than the diameter of the stationary gear planetary gear and can be made as large as desired by selecting the ratio of stationary planetary gear diameter to platform planetary gear diameter near one.

Rotational backlash is eliminated by using more than one drive motor with one motor assigned exclusively to one control torque polarity and another motor assigned exclusively to control the opposite control torque polarity such that the net torque delivered to platform gear is the desired magnitude and polarity but independent of planetary gear position relative to the platform or stationary gears.

The compensating inertia structure is the mounting structure for the drive motors spaced around the stationary gear and can accommodate as many as dimensions permit.

Since the drive motors inertia, and rotational momentum is part of the compensating inertia angular momentum, adding additional motors reduces the mass and inertia of flywheel necessary to achieve compensating inertia angular momentum necessary to offset pointed device angular momentum.

DESCRIPTION OF THE PREFERRED EMBODIMENT

Figure 1:
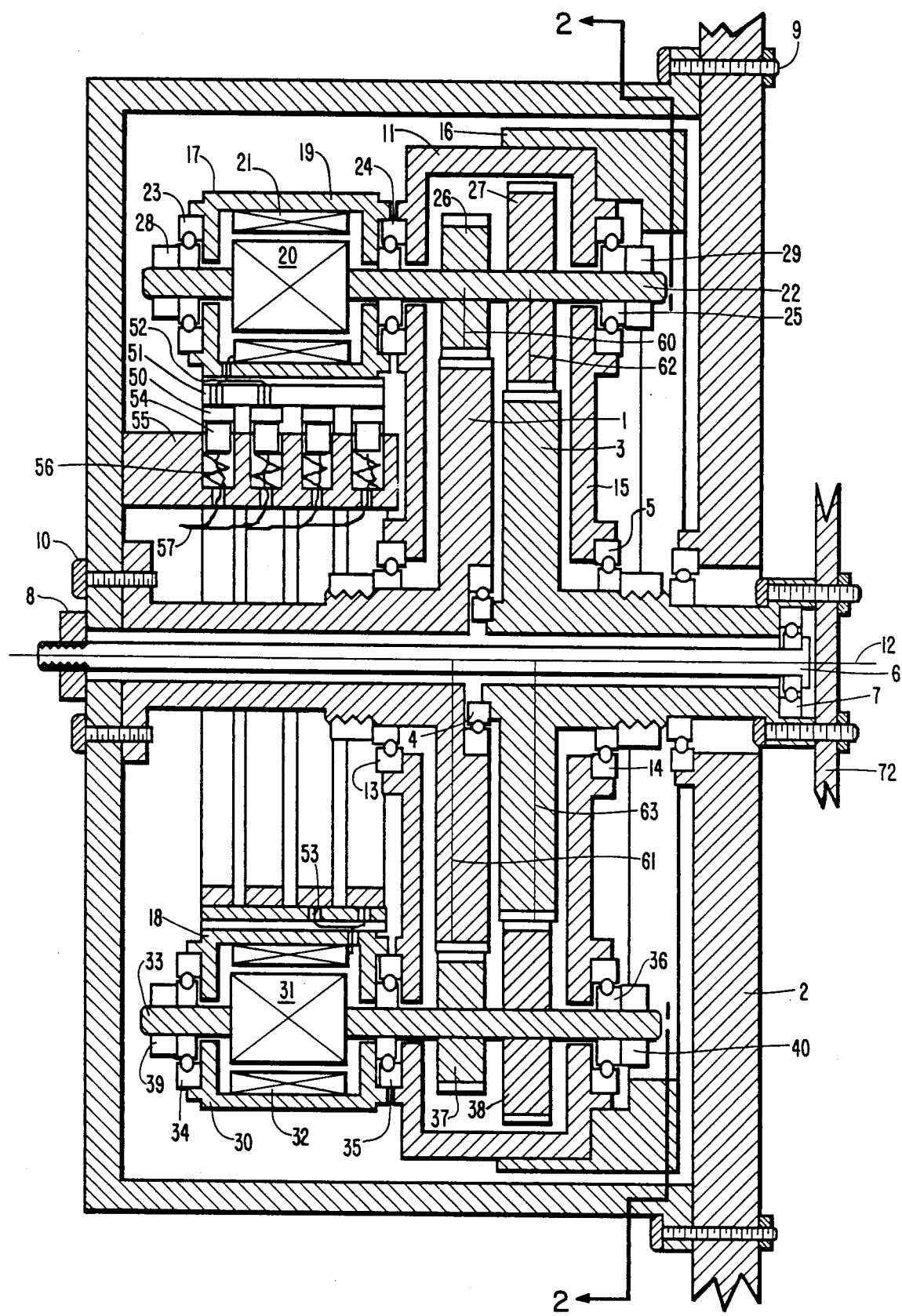
FIG. 1 shows a side elevation view of the invention.

The rotationally balanced differential momentum compensated actuator is a differential gear mechanism consisting of a stationary gear 1 rotationally fixed to the base vehicle structure 2 by attachment 9 and 10, a platform gear 3 rotationally supported relative to stationary gear 1 by bearing 4 and rotationally supported relative to base vehicle structure 2 by bearing 5. Supporting platform gear 3 between the base vehicle structure 2 and gear structure 1, assures no movement of the mass center of gear 3 orthogonal to the actuator rotational axis 12 due to unbalanced loading of gear 3. All rotating actuator elements are rotationally balanced which is equivalent to having the mass centers of all combinations of actuator elements rotating at the same rotational rate on the actuator rotational axis 12. Bearings 4 and 5 are axially preloaded by adjusting with nut 8 the length of shaft 6, rotationally supported relative to gear 3 by bearing 7. Nut 8 is external to structure 2 enclosing the actuator and can be used to adjust bearing preloads while the actuator is at rest or during rotation. Compensating inertia 11 is rotationally supported relative to gear 1 by bearing 13 and rotationally supported relative to gear 3 by bearing 14 around axis 12. Rotationally balanced compensating inertia 11 consists of compensating inertia support structure 15 supporting a variable flywheel mass 16, and planetary motors 17,18. Planetary motor 17 consists of case 19, motor rotor 20, motor stator 21, motor shaft 22 and bearings 23,24. Shaft 22 is rotationally supported relative to structure 15 by bearings 24,25, and is fixedly attached to planetary gears 26,27. Shaft 22 has threaded attachments 28,29 that permits preloading bearings 23,24,25 and axially positioning gears 26,27 axially relative to axis 12.

Planetary motor 18 consists of case 30, motor rotor 31, motor stator 32, motor shaft 33 and bearings 34,35. Shaft 33 is rotationally supported relative to structure 15 by bearings 35,36, and is fixedly attached to gears 37,38. Shaft 33 has threaded attachments 39,40 that permits preloading bearings 34,35,36 and axially positioning gears 37,38 axially relative to axis 12.

Power is provided to motors 17,18 by cylindrical conductive slip rings 50 attached to a cylindrical insulator 51 fixedly attached to motor cases 19,30 such that insulator and slip rings rotate with, and increase the rotational inertia of, the compensating inertia 11. Conductive means 52,53 are provided through insulator 51 and motor cases 19,30 between rings 50 and motors 17,18. Conductive brushes 54 are constrained from rotation by insulator brush block 55 attached to base vehicle structure 2. Brushes 54 are held in contact with slip rings 50 by springs 56 and are connected by conductive means 57 to motor drive power.

Torquing motor rotor 20 relative to motor stator 21 results in rotation of gears 26,27 relative to structure 15. Interaction of gear 26 with stationary gear 1 results in rotation of compensating inertia 11 at an angular rate proportional to the motor 20 angular rate as follows:

$$W11/12 = W20/11 * (R26/R1)$$

$W11/12$ = Angular rate of compensating inertia 11 relative to axis 12;
$W20/11$ = Angular rate of motor 20 relative to compensating inertia 11;
$R26$ = Radius of gear 26 indicated by 60;
$R1$ = Radius of gear 1 indicated by 61.

*indicates multiplication

Since gear 27 rotates at the same rate as gear 26, it follows that the angular rate of platform gear 3 relative to axis 12 is the angular rate of the compensating inertia 11 minus the angular rate of gear 3 determined as if the compensating inertia 11 were not moving expressed as follows:

$$W3/12 = W20/11(R26/R1) - W20/11*(R27/R3)32$$
$$W20/11*(R26/R1 - R27/R3)$$

$W3/12$ = Angular rate of platform gear 3 relative to axis 12;
$R27$ = Radius of gear 27 indicated by 62;
$R3$ = Radius of gear 3 indicated by 63.

From the equations above the ratio of compensation inertia 11 angular rate to platform gear 3 angular rate relative to axis 12 is expressed as follows:

$$(W11/12)/(W3/12) = 1/(1-N)$$

$$N = R27*R1/(R26*R3).$$

Making N greater than one subject to the following constraint:

$$R1 + R26 = R3 + R27,$$

and selecting R27 greater than R26 results in the polarity of the compensating inertia 11 angular rate opposite to the pointed gear 3 angular rate relative to the actuator rotational axis 12 as required for momentum compensation.

The magnitude of the angular rate difference between platform gear 3 and compensating inertia 11 relative to stationary gear 1 can be adjusted to as large as desired within manufacturing tolerances by selecting the magnitude of N sufficiently close to but greater than one.

Mechanical backlash occurs attempting to change torque polarity between meshing gears across a mechanical clearance. Mechanical backlash between drive motors 17,18 and platform gear 3 is eliminated by assigning one platform gear 3 control torque polarity to motor 17 and the other platform gear 3 control torque polarity to motor 18. Control of the torque magnitude produced by each motor produces the desired net torque magnitude and polarity on platform gear 3. This methodology assures that the net torque acting on platform gear 3 is independent of the gear mesh position between gears 1, 26 and 3,27 or 1,37 and 3,38 eliminating rotational backlash.

Figure 2:
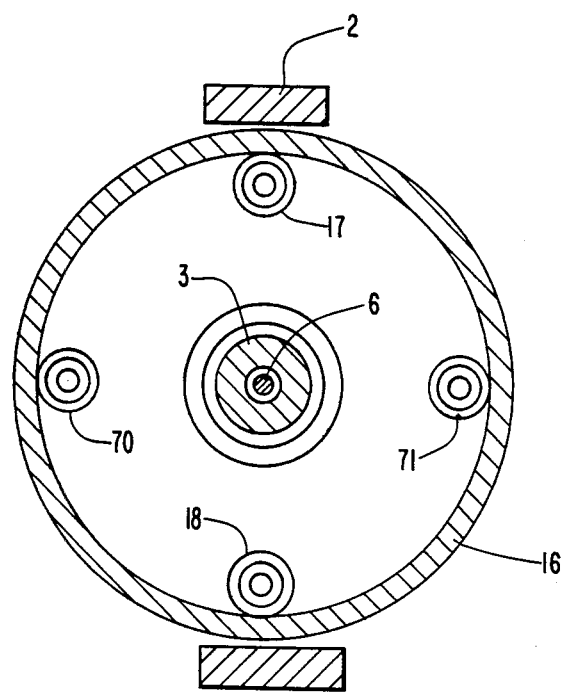
FIG. 2 shows a cross section taken along line 2—2 of FIG. 1.

FIG. 2 is the differential gear momentum compensated actuator end view illustrating drive motor installations 16,17, and two redundant motors installations 70,71 positioned around axis 12.

The object of momentum compensation is to have the angular momentum (inertia times the angular rate) of compensating inertia elements offset the angular momentum of platform gear 3 and the pointed structure 72 relative to the rotary actuator rotational axis 12. The rotational inertia of compensating inertia 11 includes structure 15, slip rings 50, insulator 51, flywheel 16, and motor installations 18,17,70,71. However, the angular momentum of the compensating inertia 11 also includes the angular momentum of the planetary motors 17,18,70,71. Therefore increasing the number, mass, moment of inertia, and rotational rate of active motor installions 18,17,70,71 reduces the mass required of variable flywheel mass 16 to achieve the desired compensating inertia angular momentum.

Having described the invention, I claim:

1. A rotationally balanced actuator rotationally articulating a pointed structure relative to a compensating inertia about a rotary actuator rotational axis comprising:
   a differential gear being supported between base vehicle structures so that the mass center of the differential gear, under a rotational load, remains on the rotary actuator rotational axis;
   a compensting inertia rotationally supported by ball bearings relative to the differential gear with the compensating inertia force loads positioned between the ball bearings so that the compensating inertia's mass center remains on the rotary actuator rotational axis.

2. The rotationally balanced actuator of claim 1 wherein the differential gear comprises:
   a stationary gear fixedly attached to a base vehicle structure and providing rotational support for the compensating inertia;
   a platform gear attached to the pointed structure being rotationally supported between a ball bearing supported by the stationary gear and a ball bearing supported by the base vehicle structure, and providing a rotational support for the compensating inertia;
   a platform gear support ball bearing preload means.

3. The rotationally balanced actuator of claim 1 wherein the compensating inertia comprises:
   a compensating inertia support structure rotationally supported by a bearing relative to the stationary gear and rotationally supported by a bearing relative to the platform gear;
   a flywheel inertia being a variable mass structure fixedly attached to the compensating inertia support structure and having a mass center on the rotary actuator rotational axis;
   a plurality of large and small diameter planetary gears meshing with the stationary and the platform gears;
   a plurality of planetary motors driving the planetary gears with the combined mass center of planetary motors and planetary gears on the rotary actuator rotational axis;
   a sliprings-insulator structure attached directly to the planetary motors as a means to transmit electrical power to the planetary motors and as a means to increase the inertia of the compensating inertia;

4. The differential gear of claim 2 wherein the stationary gear comprises cylindrical structure with gear teeth on the exterior cylindrical periphery meshing with the small diameter planetary gears and acting as a rotational support for the platform gear and the compensating inertia.

5. The differential gear of claim 2, wherein the platform gear comprises cylindrical structure being supported between preloaded ball bearings with gear teeth on the exterior cylindrical periphery meshing with the large diameter planetary gears.

6. The compensating inertia of claim 3, wherein the planetary gears comprises:
   a pluarity of combinations of elements with each combination including: a small diameter planetary gear meshing with the stationary gear;
   a large diameter planetary gear meshing with the platform gear and rotating in the opposite direction as the platform gear relative to the rotary actuator rotational axis;
   A planetary gear shaft fixedly attached to the small diameter planetary gear and the large diameter planetary gear, the planetary gear shaft supporting the small and the large diameter planetary gears between bearings supported by the compensating inertia support structure and being rotationally torqued relative to the compensating inertia support structure by the planetary motors.

7. The planetary gears of claim 6, wherein the small diameter planetary gears comprises cylindrical structure fixedly attached to the planetary gear shaft with gear teeth on the exterior cylindrical surface meshing with the stationary gear's gear teeth.

8. The planetary gears of claim 6, wherein the large diameter planetary gears comprises cylindrical structure fixedly attached to the planetary gear shaft with gear teeth on the exterior cylindrical surface meshing with the platform gear's gear teeth.

9. The planetary gears of claim 6, wherein each of the plurality of the planetary gear shafts comprises a shaft structure fixedly attached to the large and the small diameter planetary gears with each planetary gear shaft being rotationally supported between bearings in the compensating inertia support structure and being torqued relative to the compensating inertia support structure by the planetary motors.

10. The compensating inertia of claim 3, wherein the plurality of the planetary motors comprises at least two of the planetary motors torquing relative to the compensating inertia structure with opposing torque polarities but different torque magnitudes eliminating rotational backlash between the small diameter planetary gears and the stationary gear and between the large diameter planetary gears and the platform gears.

11. The stationary gear of claim 4 further comprises a cylindrical gear structure larger in diameter than the platform gear diameter resulting in the rotational polarity of the compensating inertia relative to the rotary actuator rotational axis being opposite to the rotational polarity of the platform gear relative to the rotary actuator rotational axis, and resulting in the magnitude of the rotational rate of the compensating inertia being greater than the magnitude of the rotational rate of the platform gear by the ratio $1/(1-N)$, with N being the ratio of the product of the diameter of the large diameter planetary gear and the diameter of the stationary gear divided by the product of the diameter of the small diameter planetary gear and the diameter of the platform gear when the sum of the diameter of the stationary gear and the diameter of the small diameter planetary gear equaling the sum of the diameter of the platform gear and the diameter of the large diameter planetary gear.

12. The differential gear of claim 2 wherein the platform gear support ball bearing preload means comprises a shaft structure coaxial with the rotary actuator rotational axis and rotationally supported by a ball bearing relative to the platform gear with a non rotating threaded means external to the base vehicle structural enclosing the rotationally balanced actuator to permit convienent adjustment of axial shaft tension between the platform gear and the stationary gear while the rotary actuator is rotating or not rotating.

13. The compensating inertia of claim 3, wherein the compensating inertia support structure comprises structure rotationally supported about the rotary actuator rotational axis by a bearing relative to the stationary gear and by a bearing relative to the platform gear; the compensating inertia support structure being the rotational structural support for the planetary gears, the planetary motors, the flywheel inertia and the sliprings-insulator stucture; and the compensating inertia support structure maintaining the planetary ger shafts parallel to the rotary actuator rotational axis and constraining the teeth of the small diameter planetary gears gear to mesh with the correct clearance with the teeth of the stationary gear and the teeth of the large diameter planetary gears gear to mesh with the correct clearance with the teeth of the platform gear.

14. The compensating inertia of claim 3, wherein the sliprings-insulator structure comprises cylindrical conductive sliprings supported relative to the rotary actuator rotational axis by a cylindrical insulator fixedly attached to and revolving with the planetary torquing means to provide electrical power to the planetary motors, to confine rotating electrical wires within insulting structure, and to supplement the compensating inertia rotatoional inertia.

* * * * *